United States Patent [19]

Arai

[11] Patent Number: 5,331,633

[45] Date of Patent: Jul. 19, 1994

[54] HIERARCHICAL BUS TYPE MULTIDIRECTIONAL MULTIPLEX COMMUNICATION SYSTEM

[75] Inventor: Koju Arai, Tokyo, Japan

[73] Assignee: NEC Corporation, Japan

[21] Appl. No.: 22,115

[22] Filed: Feb. 25, 1993

[30] Foreign Application Priority Data

Feb. 27, 1992 [JP] Japan .................................. 4-076101

[51] Int. Cl.[5] .............................................. H04J 3/12
[52] U.S. Cl. ................................ 370/85.11; 370/94.3; 370/110.1
[58] Field of Search ............... 370/85.11, 85.12, 85.13, 370/85.14, 94.1, 94.3, 13, 16, 15, 85.1, 94.2, 60, 60.1, 67, 110.1; 371/11.1, 11.2; 379/2, 15, 16, 27, 32; 340/825.5, 825.51

[56] References Cited

U.S. PATENT DOCUMENTS

| 4,393,492 | 7/1983 | Bishop .................................. 370/15 |
| 4,686,668 | 8/1987 | Koseki et al. ......................... 370/15 |
| 4,768,202 | 8/1988 | Lacroix et al. ...................... 370/13.1 |

OTHER PUBLICATIONS

NEC, Computers and Communications, "DRMASS Digital Radio Multiple Access Subscriber System", Cat. No. E42287.

*Primary Examiner*—Wellington Chin
*Attorney, Agent, or Firm*—Ostrolenk, Faber, Gerb & Soffen

[57] ABSTRACT

A downward transmission line D and an upward transmission line U are provided with a control channel CCH and n pieces of voice channels VCH1-VCHn respectively. Control channel use flag data 101 showing a "free" or "engaged" state of the channel, mode data 102 showing "a control channel retention mode" or "a call-out mode", call-out station number data 103 showing "a station number of a call-out tributary station", transmission voice channel number data 104 showing "a number of voice channel for transmission", reception voice channel number data 105 showing "a number of voice channel for reception", and call-in subscriber number data 106 showing "a subscriber number of a call-in subscriber", are multiplexed on the control channel CCH. Voice channel use flag data 201 showing a "free" or "engaged" state of the cannel and voice data 202 being individual data are multiplexed on each of the voice channels VCH1-VCHn.

10 Claims, 3 Drawing Sheets

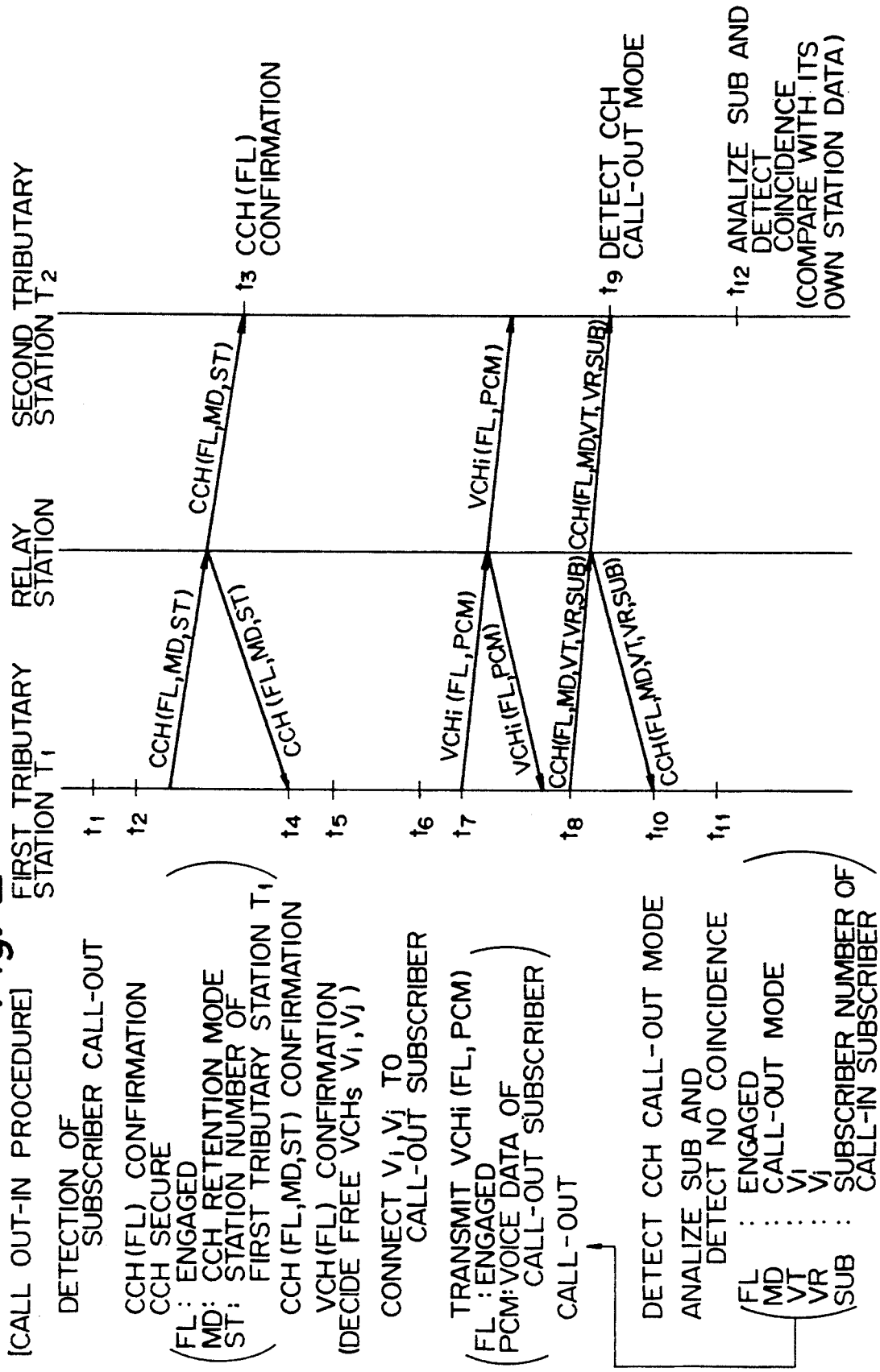

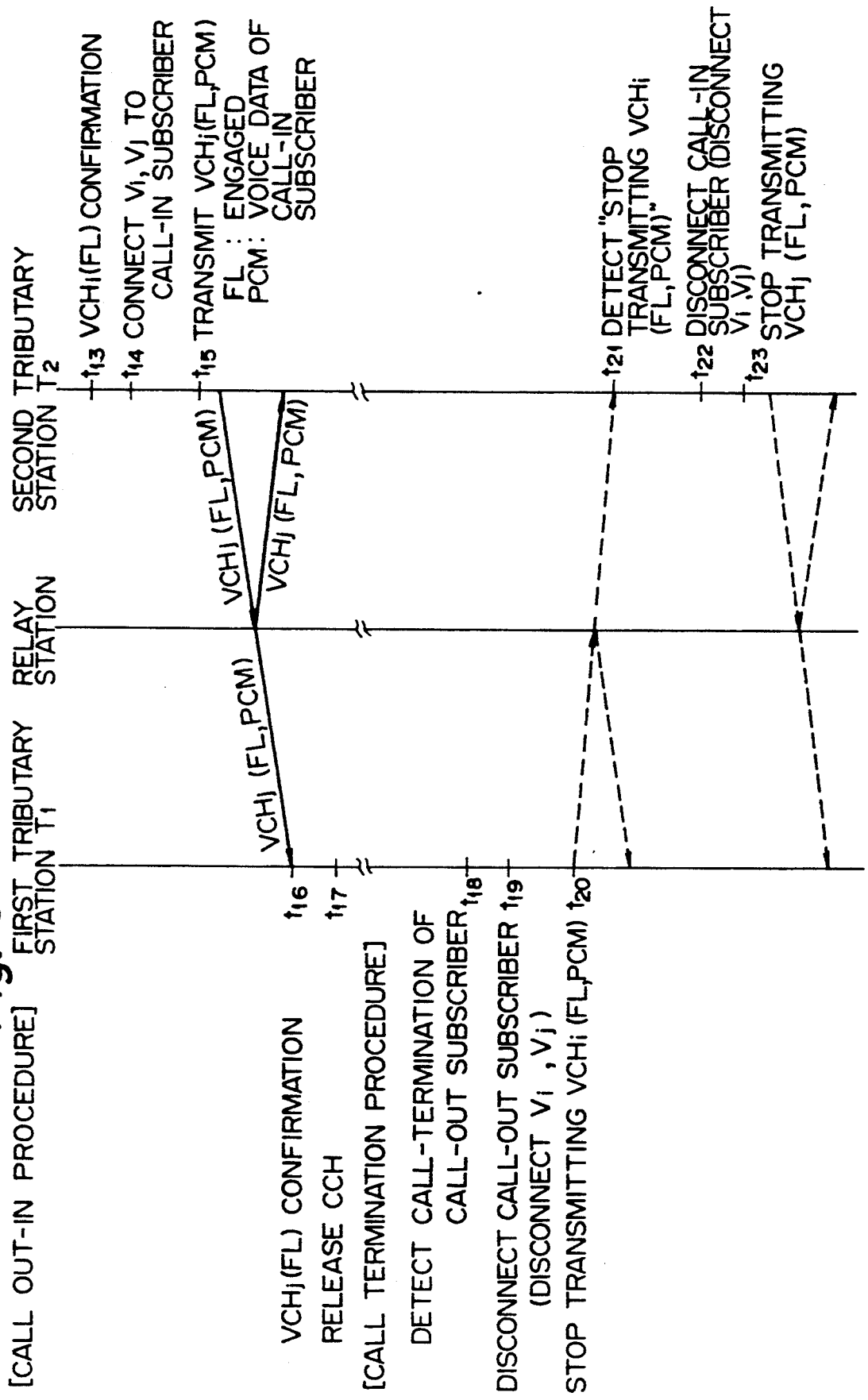

HIERARCHICAL BUS TYPE MULTIDIRECTIONAL MULTIPLEX COMMUNICATION SYSTEM

BACKGROUND OF THE INVENTION

The present invention relates to a hierarchical bus type multidirectional multiplex communication system.

The hierarchical bus type multidirectional multiplex communication system has been composed of, for example, a master station and a plurality of relay stations and tributary stations hierarchically connected to the master station respectively. The hierarchical bus type multidirectional multiplex communication system is structured such that, when a fault is generated in any one of the master station or the relay stations of the system, a relay station positioned one rank lower than the master station or the relay station having the fault can perform the same function as the master station does, thereby making a plurality of lower order tributary stations positioned lower than the relay station able to communicate normally.

However, to realize the above, the relay station positioned one rank lower than the fault-generated master station or relay station must have a complex function the same as the master station, because it must control the lower order stations in the same way as the master station by performing switching control based on the preliminarily prepared station data of the lower order stations.

SUMMARY OF THE INVENTION

An object of the present invention is to provide a hierarchical bus type multidirectional multiplex communication system which does not require any complex control of station data in a relay station.

Other objects of the present invention will become obvious from the following description.

In accordance with an aspect of the present invention, there is provided a hierarchical bus type multidirectional multiplex communication system which comprises: a higher order station; a relay station connected to the higher order station through a first upward transmission line for transmitting first upward signals and a first downward transmission line for transmitting first downward signals; a tributary station connected to the relay station through a second upward transmission line for transmitting second upward signals and a second downward transmission line for transmitting second downward signals; wherein, the second upward transmission line and the second downward transmission line comprise respectively: a control channel on which control channel use flag data showing a "free" or "engaged" state of the channel, mode data showing "a control channel retention mode" or "a call-out mode," call-out station number data showing "a station number of a call-out tributary station," transmission voice channel number data showing "a channel number of a voice channel for transmission," reception voice channel number data showing "a channel number of a voice channel for reception," and call-in subscriber number data showing "a subscriber number of a call-in subscriber" are multiplexed; and a plurality of voice channels on each of which voice channel use flag data showing a "free" or "engaged" state of the channel and individual data are multiplexed.

BRIEF DESCRIPTION OF THE DRAWINGS

The features and advantages of the invention will become apparent from the following description when taken in conjunction with the accompanying drawings in which:

FIG. 2 is a timing chart showing a part of call out-in and call termination procedures between the relay station and the tributary stations shown in FIG. 1.

FIG. 3 is a timing chart showing the remaining part of the call out-in and call termination procedures between the relay station and the tributary stations shown in FIG. 1.

DESCRIPTION OF THE PREFERRED EMBODIMENTS

Figure 1:
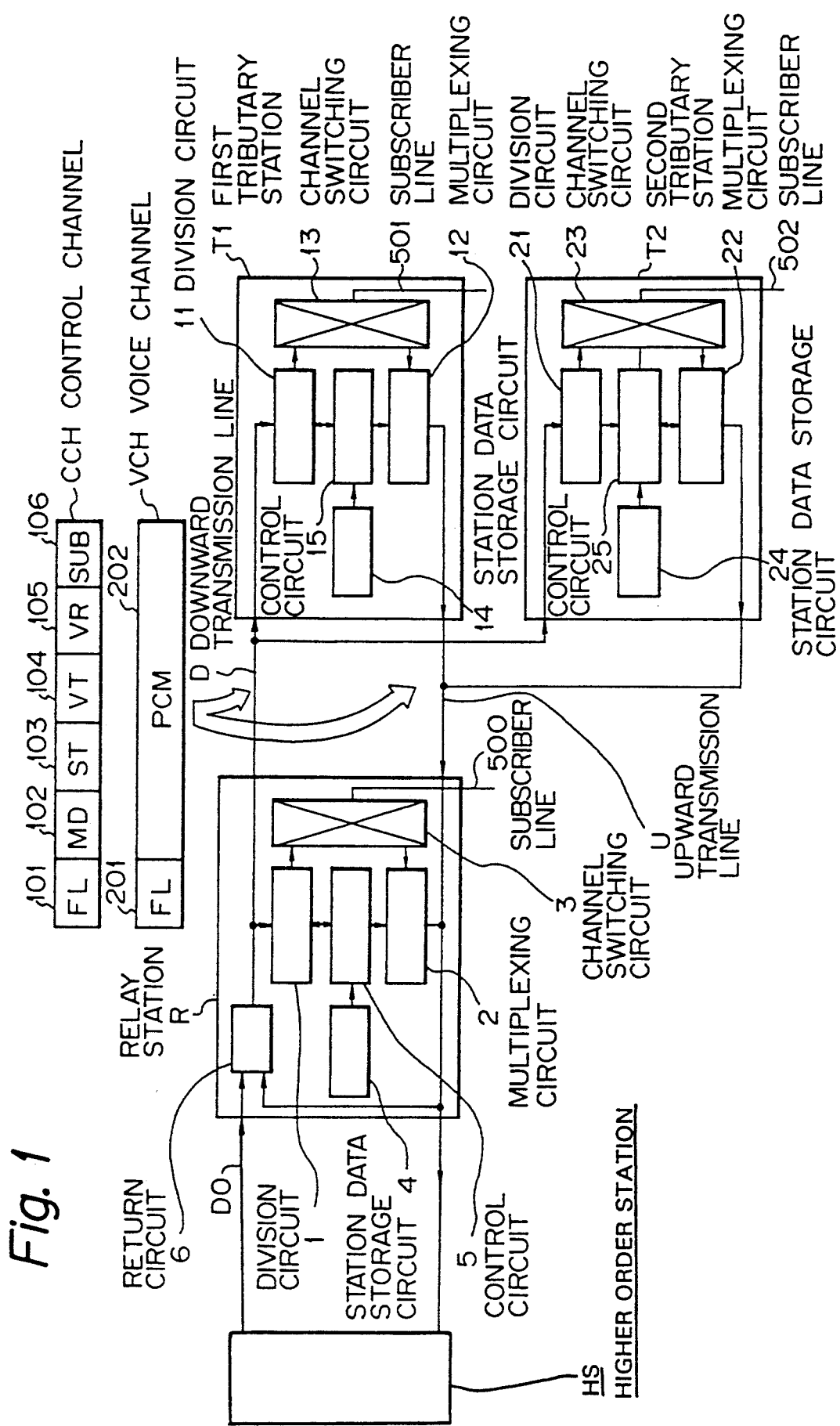
FIG. 1 is a block diagram of an embodiment of a hierarchical bus type multidirectional multiplex communication system of the present invention.

Description will be made with reference to an embodiment of a hierarchical bus type multidirectional multiplex communication system of the present invention exemplifying communication to be executed when a fault is generated in a higher order station HS of a relay station R shown in FIG. 1, the communication being exchanged between the relay station R and two tributary stations (a first tributary station T1 and a second tributary station T2) positioned one rank lower than the relay station R.

The relay station R and the first tributary station T1, and the relay station R and the second tributary station T2 are connected respectively with a downward transmission line D for transmitting downward signals and an upward transmission line U for transmitting upward signals. The downward transmission line D and the upward transmission line U are provided with a control channel CCH and n pieces of voice channels VCH1-VCHn respectively. The control channel CCH is divided into six transmission areas, and on each of which control channel use flag data (FL) 101 showing a "free" or "engaged" state of the channel, mode data (MD) 102 showing "a control channel retention mode" or "a call-out mode," call-out station number data (ST) 103 showing "a station number of a call-out tributary station," transmission voice channel number data (VT) 104 showing "a channel number of a voice channel for transmission," reception voice channel number data (VR) 105 showing "a channel number of a voice channel for reception," and call-in subscriber number data (SUB) 106 showing "a subscriber number of a call-in subscriber" are multiplexed respectively. Each of the voice channels VCH1-VCHn is divided into two transmission areas, and on one of the transmission areas, voice channel use flag data (FL) 201 showing a "free" or "engaged" state of the channel is multiplexed, and on the other area, voice data (PCM) 202 being individual data is multiplexed.

The relay station R comprises, as shown in FIG. 1, a division circuit 1, a multiplexing circuit 2, a channel switching circuit 3, a station data storage circuit 4, a control circuit 5 and a return circuit 6. The return circuit 6 receives downward signals transmitted from the higher order station through a downward transmission line D0 which connects the higher order station HS and the relay station R, and upward signals transmitted from the first tributary station T1 or the second tributary station T2 through the upward transmission line U. When the return circuit 6 detects a fault generated in the higher order station HS by monitoring downward signals received from the higher order station HS it returns upward signals received from each tributary station T1, T2 back to each tributary station T1, T2 through the downward transmission line D. According to the instruction of the control circuit 5, the division circuit 1 which is connected to the downward transmission line D divides each of the data multiplexed on the control channel CCH and each voice channel VCH1–VCHn of the downward transmission line D, and then outputs each of the divided data to the control circuit 5 and the channel switching circuit 3. According to the instruction of the control circuit 5, the multiplexing circuit 2 multiplexes the data received from the control circuit 5 or the channel switching circuit 3 on the control channel CCH or each voice channel VCH1–VCHn of the upward transmission line U. According to the instruction of the control circuit 5, the channel switching circuit 3 outputs the data received from the division circuit 1 to a subscriber line 500 and connects the subscriber line 500 to the multiplexing circuit 2. According to the instruction of the control circuit 5, the station data storage circuit 4 outputs the station data (the station number of its own station and the subscriber number) designated by the control circuit 5 to the control circuit 5. The control circuit 5 controls the division circuit 1, the multiplexing circuit 2, the channel switching circuit 3 and the station data storage circuit 4 respectively for the call-out operation, the call-in operation and the call terminating operation.

The first tributary station T1 comprises, as shown in FIG. 1, a division circuit 11, a multiplexing circuit 12, a channel switching circuit 13, a station data storage circuit 14 and a control circuit 15. According to the instruction of the control circuit 15, the division circuit 11 which is connected to the downward transmission line D divides each of the data multiplexed on the control channel CCH and each voice channel VCH1–VCHn of the downward transmission line D, and then outputs each of the divided data to the control circuit 15 and the channel switching circuit 13. According to the instruction of the control circuit 15, the multiplexing circuit 12 multiplexes the data received from the control circuit 15 or the channel switching circuit 13 on the control channel CCH or each voice channel VCH1–VCHn of the upward transmission line U. According to the instruction of the control circuit 15, the channel switching circuit 13 outputs the data received from the division circuit 11 to a subscriber line 501 and connects the subscriber line 501 to the multiplexing circuit 12. According to the instruction of the control circuit 15, the station data storage circuit 14 outputs the station data (the station number of its own station and the subscriber number) designated by the control circuit 15 to the control circuit 15. The control circuit 15 controls the division circuit 11, the multiplexing circuit 12, the channel switching circuit 13 and the station data storage circuit 14 respectively for the call-out operation, the call-in operation and the call terminating operation.

The second tributary station T2 comprises, as shown in FIG. 1, a division circuit 21, a multiplexing circuit 22, a channel switching circuit 23, a station data storage circuit 24 and a control circuit 25. According to the instruction of the control circuit 25, the division circuit 21 which is connected to the downward transmission line D divides each of the data multiplexed on the control channel CCH and each voice channel VCH1–VCHn of the downward transmission line D, and then outputs each of the divided data to the control circuit 25 and the channel switching circuit 23. According to the instruction of the control circuit 25, the multiplexing circuit 22 multiplexes the data received from the control circuit 25 or the channel switching circuit 23 on the control channel CCH or each voice channel VCH1–VCHn of the upward transmission line U. According to the instruction of the control circuit 25, the channel switching circuit 23 outputs the data received from the division circuit 11 to a subscriber line 502 and connects the subscriber line 502 to the multiplexing circuit 22. According to the instruction of the control circuit 25, the station data storage circuit 24 outputs the station data (the station number of its own station and the subscriber number) designated by the control circuit 25 to the control circuit 25. The control circuit 25 controls the division circuit 21, the multiplexing circuit 22, the channel switching circuit 23 and the station data storage circuit 24 respectively for the call-out operation, the call-in operation and the call terminating operation.

Next, description will be made with reference to the call-out operation and the call-in operation of the relay station R, the first tributary station T1 and the second tributary station T2 to be performed when a fault is generated in the higher order station HS of the relay station R, exemplifying the case in which a subscriber of the first tributary station T1 calls out and a subscriber of the second tributary station T2 calls in, referring to FIG. 2 and FIG. 3. In the following description, the subscribers of the first tributary station T1 and the second tributary station T2 will be referred to as a call-out subscriber and a call-in subscriber respectively.

On detecting a call-out signal from the call-out subscriber at time $t_1$ of FIG. 2, the control circuit 15 of the first tributary station T1 examines at time $t_2$ whether the control channel use flag data 101 of the control channel CCH of the downward transmission line D received from the division circuit 11 shows a signal "free" or not. When the signal "free" shown by the control channel use flag data 101 is confirmed, the control circuit 15 reads the station number of its own station (the station number of the first tributary station T1) from the station data storage circuit 14, and then gives the instruction to the multiplexing circuit 12 to multiplex the control channel use flag data 101 showing a signal "engaged," the mode data 102 showing "a control channel retention mode," and the call-out station number data 103 showing "the station number of the first tributary station Ti" on the control channel CCH of the upward transmission line U respectively. At this time, the return circuit 6 of the relay station R which has detected the generation of the fault in the higher order station HS operates to return the upward signals transmitted from each tributary station T1, T2 to the relay station R through the upward transmission line U back to each tributary station T1, T2 through the downward transmission line D. Therefore, the signals in the control channel CCH transmitted from the first tributary station T1 to the relay station R through the upward transmission line U are returned back to each tributary station T1, T2 by the return circuit 6 of the relay station R, and then inputted into the division circuit 11 of the first tributary station T1 and the division circuit 21 of the second tributary station T2 respectively.

The control circuit 15 of the first tributary station T1 confirms at time $t_4$ that the control channel use flag data 101, the mode data 102 and the call-out station number data 103, which are multiplexed on the control channel CCH of the downward transmission line D received from the division circuit 11, show respectively the signal "engaged", "the control channel retention mode" and "the station number of the first tributary station T1 (the station number of its own station)," and hence confirms that the control channel CCH of the downward transmission line D has been secured.

On the other hand, the control circuit 25 of the second tributary station T2 confirms at time $t_3$ that the control channel use flag data 101, which is multiplexed on the control channel CCH of the downward transmission line D received from the division circuit 21, shows the signal "engaged," and hence confirms that it is impossible to multiplex any data from the second tributary station T2 on the control channel CCH of the upward transmission line U.

The control circuit 15 of the first tributary station T1 selects at time $t_5$ two free voice channels (a first voice channel VCH1 and a second voice channel VCHj) from the control channel use flag data 201 which is multiplexed on each voice channel VCH1-VCHn of the downward transmission line D received from the division circuit 11, and hence obtains the voice channel number Vi of the first voice channel VCHi and the voice channel number Vj of the second voice channel VCHj. The control circuit 15 instructs the channel switching circuit 13 at time $t_6$ to connect the first and second voice channels VCHi, VCHj to the subscriber line 501 of the call-out subscriber. The first voice channel VCHi is used for transmission and the second voice channel VCHj for reception. The control circuit 15 instructs the multiplexing circuit 12 at time $t_7$ to multiplex the voice channel use flag data 201 showing the signal "engaged" and the voice data 202 showing "voice data of the call-out subscriber" on the first voice channel VCHi of the upward transmission line U. The control circuit 15 instructs the multiplexing circuit 12 at time $t_8$ to multiplex the control channel use flag data 101 showing the signal "engaged," the mode data 102 showing "a call-out mode," the transmission voice channel number data 104 showing "the voice channel number Vi of the first voice channel VCHi," the reception voice channel number data 105 showing "the voice channel number Vj of the second voice channel VCHj," and the call-in subscriber number data 106 showing "the subscriber number of the call-in subscriber" on the control channel CCH of the upward transmission line U. Thereafter, the control circuit 15 turns to monitor the change of the voice channel use flag data 201, which is multiplexed on the second voice channel VCHj corresponding to the voice channel number Vj shown by the reception voice channel number data 105, from the signal "free" to the signal "engaged."

Signals in the control channel CCH of the upward transmission line U transmitted from the first tributary station T1 are returned by the return circuit 6 of the relay station R and transmitted respectively to the division circuit 11 of the first tributary station T1 and the division circuit 21 of the second tributary station T2. When the control circuit 15 of the first tributary station T1 confirms at time $t_{10}$ that the mode data 102, which is multiplexed on the control channel CCH of the downward transmission line D received from the division circuit 11, shows "the call-out mode," the control circuit 15 reads out sequentially "subscriber numbers of its own station" stored in the station data storage circuit 14, and then detects whether the read number corresponds with "the subscriber number of the call-in subscriber" shown by the call-in subscriber number data 106 which is multiplexed on the control channel CCH of the downward transmission line D. Since there is no "subscriber number of its own station" which corresponds with the data 106 in this case, the control circuit 15 recognizes at time $t_{11}$ that it is not a call-in to its station and neglects the call-out signal transmitted by the control channel CCH of the downward transmission line D.

On the other hand, when the control circuit 25 of the second tributary station T2 confirms at time $t_9$ that the mode data 102, which is multiplexed on the control channel CCH of the downward transmission line D received from division circuit 21, shows "the call-out mode," the control circuit 25 reads out sequentially "subscriber numbers of its own station" stored in the station data storage circuit 24, and then detects whether the read number corresponds with "the subscriber number of the call-in subscriber" shown by the call-in subscriber number data 106 which is multiplexed on the control channel CCH of the downward transmission line D. Since there is "a subscriber number of its own station" which corresponds with the data 106 in this case, the control circuit 25 recognizes that it is the call-in to its station. Then the control circuit 25 obtains, at time $t_{13}$ shown in FIG. 3, "the voice channel number Vi and the voice channel number Vj" from the transmission voice channel number data 104 and the reception voice channel number data 105 which are multiplexed on the control channel CCH of the downward transmission line D, and confirms that the voice channel use flag data 201, which is multiplexed on the first voice channel VCHi corresponding to the voice channel number Vi, shows the signal "engaged." The control circuit 25 instructs the channel switching circuit 23 at time $t_{14}$ to connect the first voice channel VCHi and the second voice channel VCHj to the subscriber line 502 which corresponds to "the subscriber number of the call-in subscriber" shown by the call-in subscriber number data 106 multiplexed on the control channel CCH of the downward transmission line D. The control circuit 25 instructs the multiplexing circuit 22 at time $t_{15}$ to multiplex the voice channel use flag data 201 showing the signal "engaged" and the voice data 202 showing "voice data of the call-in subscriber" on the second voice channel VCHj of the upward transmission line U.

Signals in the second voice channel VCHj of the upward transmision line U transmitted from the second tributary station T2 are returned by the return circuit 6 of the relay station R, and then transmitted respectively to the division circuit 11 of the first tributary station T1 and the division circuit 21 of the second tributary station T2. The control circuit 15 of the first tribuary station T1 confirms at time $t_{16}$ that the voice channel use flag data 201 of the second voice channel VCHj of the downward transmission line D turned to the signal "engaged," and recognizes the return of the response to the call-out operation (that is, the call-out procedure is completed). Thereafter, the control circuit 15 instructs the multiplexing circuit 12 at time $t_{17}$ to multiplex the control channel use flag data 101 showing the signal "free" on the control channel CCH of the upward transmission line U. With this operation, the control channel CCH which has been secured on the upward transmission line U is released.

Next, the call terminating operation will be described with reference to FIG. 3 exemplifying the case in which the subscriber of the first tributary station T1 and the subscriber of the second tributary station T2 speak with each other by using the first voice channel VCHi with the voice channel number Vi and the second voice channel VCHj with the voice channel number Vj and the subscriber of the first tributary station T1 terminates the call. Both the control circuit 15 of the first tributary station T1 and the control circuit 25 of the second tributary station T2 control the calling subscriber of its own station and the voice channel numbers of the engaged voice channels VCH. On detecting the call termination signal of the subscriber of the first tributary station T1 at time $t_{18}$, the control circuit 15 of the first tributary station T1 instructs the channel switching circuit 13 at time $t_{19}$ to disconnect the first and second voice channels VCHi, VCHj which have been used for the call from the subscriber line 501 of this subscriber. Thereafter, the control circuit 15 of the first tributary station T1 instructs the multiplexing circuit 12 at time $t_{20}$ to multiplex the voice channel use flag data 201 showing the signal "free" on the first voice channel VCHi of the upward transmission line U. According to the above, the first voice channel VCHi of the upward transmission line U is released.

When the control circuit 25 of the second tributary station T2 detects at time $t_{21}$ that the voice channel use flag data 201 on the first voice channel VCHi of the downward transmission line D received from the relay station R changes from the signal "engaged" to the signal "free", the control circuit 25 instructs the channel switching circuit 23 at time $t_{22}$ to disconnect the first and second voice channels VCHi, VCHj from the subscriber line 502 of the subscriber who has used the channel. Thereafter, the control circuit 25 instructs the multiplexing circuit 22 at time $t_{23}$ to multiplex the voice channel use flag data 201 showing the signal "free" on the second voice channel VCHj of the upward transmission line U. With this procedure, the second voice channel VCHj of the upward transmission line U is released.

While this invention has been described in conjunction with the preferred embodiments thereof, it would now be possible for any person skilled in the art to readily put this invention into practice in various other ways.

What is claimed is:

1. A hierarchical bus type multidirectional multiplex communication system, comprising;
    a higher order station;
    a relay station connected to the higher order station through a first upward transmission line for transmitting first upward signals and a first downward transmission line for transmitting first downward signals;
    a tributary station connected to the relay station through a second upward transmission line for transmitting second upward signals and a second downward transmission line for transmitting second downward signals; wherein,
    the second upward transmission line and the second downward transmission line comprise respectively:
    a control channel on which control channel use flag data showing a "free" or "engaged" state of the control channel, mode data showing "a control channel retention mode" or "a call-out mode," call-out station number data showing "a station number of a call-out tributary station," transmission voice channel number data showing "a channel number of a voice channel for transmission," reception voice channel number data showing "a channel number of a voice channel for reception," and call-in subscriber number data showing "a subscriber number of a call-in subscriber" are multiplexed; and
    a plurality of voice channels on each of which voice channel uses flag data showing a "free" or "engaged" state of the voice channel and on which individual data are multiplexed.

2. A hierarchical bus type multidirectional multiplex communication system according to claim 1, wherein the relay station comprises:
    return back means for returning the second upward signals received from the tributary station, returning as the second downward signals, when the generation of a fault in the higher order station is detected from the first downward signal received from the higher order station;
    division means connected to the return back means through the second downward transmission line for dividing each of the data multiplexed on the control channel of the second downward transmission line, and also dividing each of the data multiplexed on each voice channel of the second upward transmission line;
    multiplexing means connected to the return back means through the second upward transmission line for multiplexing each of the data on the control channel of the second upward transmission line and also multiplexing each of the data on the each voice channel of the second upward transmission line;
    switching means connected to the division means and the multiplexing means respectively for connecting each voice channel of the second downward transmission line and each voice channel of the second upward transmission line to one of subscriber lines of the relay station;
    storage means for storing a station number and subscriber numbers of its own station; and
    control means for controlling the division means, the multiplexing means, the switching means and the storage means for making them perform a call-out, a call-in and a call terminating operation respectively.

3. A hierarchical bus type multidirectional multiplex communication system according to claim 2, wherein the tributary station comprises:
    other division means connected to the second downward transmission line for dividing each of the data multiplexed on the control channel of the second downward transmission line and also dividing each of the data multiplexed on each voice channel of the second downward transmission line;
    other multiplexing means connected to the second upward transmission line for multiplexing each of the data on the control channel of the second upward transmission line and also multiplexing each of the data on the each voice channel of the second upward transmission line;
    other switching means connected to the other division means and the other multiplexing means for connecting each voice channel of the second downward transmission line and each voice channel of the second upward transmission line to one of the subscriber lines of the tributary station;
    other storage means for storing a station number and subscriber numbers of its own station; and other control means for controlling the other division means, the other multiplexing means, the other switching means and the other storage means for making them perform the call-out, the call-in and the call terminating operation respectively.

4. A hierarchical bus type multidirectional multiplex communication system according to claim 3; wherein, when the control channel use flag data, which is multiplexed on the control channel of the second downward transmission line received from the other division means, shows the signal "free," the other control means of the tributary station instructs the other multiplexing means to read out the station number of the tributary station from the other storage means and multiplex the control channel use flag data showing the signal "engaged," the mode data showing "the control channel retention mode" and the call-out station number data showing "the station number of the tributary station" on the control channel of the second upward transmission line.

5. A hierarchical bus type multidirectional multiplex communication system according to claim 4; wherein, the other control means of the tributary station confirms that it has secured the control channel of the second downward transmission line by confirming that the control channel use flag data, the mode data and the call-out station number data, which are multiplexed on the control channel of the second downward transmission line received from the other division means, show respectively the signal "engaged", "the control channel retention mode" and "the station number of its own station."

6. A hierarchical bus type multidirectional multiplex communication system according to claim 5; wherein, the other control means of the tributary station confirms that it is unable to multiplex any data from the tributary station on the control channel of the second upward transmission line by confirming that the control channel use flag data, the mode data and the call-out station number data, which are multiplexed on the control channel of the second downward transmission line received from the other division means, show respectively the signal "engaged", "the control channel retention mode" and "the station number of other station."

7. A hierarchical bus type multidirectional multiplex communication system according to claim 6; wherein, the other control means of the tributary station:
  selects free first and second voice channels from the control channel use flag data of each voice channel of the second downward transmission line received from the other division means to obtain voice channel numbers of the first and second voice channels;
  instructs the other switching means to connect the first and second voice channels to a subscriber line of a call-out subscriber of its own station;
  instructs the other multiplexing means to multiplex the voice channel use flag data showing the signal "engaged" and the individual data showing "voice data of the call-out subscriber" on the first voice channel of the second upward transmission line; and
  instructs the other multiplexing means to multiplex the control channel use flag data showing the signal "engaged," the mode data showing "the call-out mode," the transmission voice channel number data showing "the voice channel number of the first voice channel," the reception voice channel number data showing "the voice channel number of the second voice channel," and the call-in subscriber number data showing "the subscriber number of the call-in subscriber" on the control channel of the second upward transmission line.

8. A hierarchical bus type multidirectional multiplex communication system according to claim 7; wherein, when it is confirmed that the mode data, which is multiplexed on the control channel of the second downward transmission line received from the other division means, shows "call-out mode," the other control means of the tributary station:
  sequentially reads out the subscriber numbers of the tributary station stored in the other storage means, and then examines whether there is a subscriber number corresponding with "the subscriber number of the call-in subscriber" which is shown by the call-in subscriber number data multiplexed on the control channel of the second downward transmission line; and
  recognizes that it is not a call-in to the tributary station when there is no subscriber number; or
  recognizes that it is a call-in to the tributary when there is a corresponding subscriber number of the tributary station, obtains the transmission voice channel number and the reception voice channel number from the transmission voice channel number data and the reception voice channel number data which are multiplexed on the control channel of the second downward transmission line, and instructs the other switching means to confirm the signal "engaged" of the voice channel use flag data multiplexed on the first voice channel corresponding to the transmission voice channel number and to connect the first and second voice channels to a subscriber line corresponding to "the subscriber number of the call-in subscriber" shown by the call-in subscriber number data multiplexed on the control channel of the second downward transmission line, and instructs the other multiplexing means to multiplex the voice channel use flag data showing the signal "engaged" and the individual data showing "voice data of the call-in subscriber" on the second voice channel of the second upward transmission line.

9. A hierarchical bus type multidirectional multiplex communication system according to claim 8; wherein, on detecting a call termination of the call-out subscriber, the other control means of the tributary station instructs the other switching means to disconnect the first and second voice channels from the subscriber line of the call-out subscriber, and then instructs the other multiplexing means to multiplex the voice channel use flag data showing the signal "free" on the first voice channel of the second upward transmission line.

10. A hierarchical bus type multidirectional multiplex communication system according to claim 9; wherein, on detecting that the voice channel use flag data of the first voice channel of the second downward transmission line received from the other division means has changed from the signal "engaged" to the signal "free", the other control means of the tributary station instructs the other switching means to disconnect the first and second voice channels from the subscriber line of the call-in subscriber, and instructs the other multiplexing means to multiplex the voice channel use flag data showing the signal "free" on the second voice channel of the second upward transmission line.

* * * * *